Figure 1:
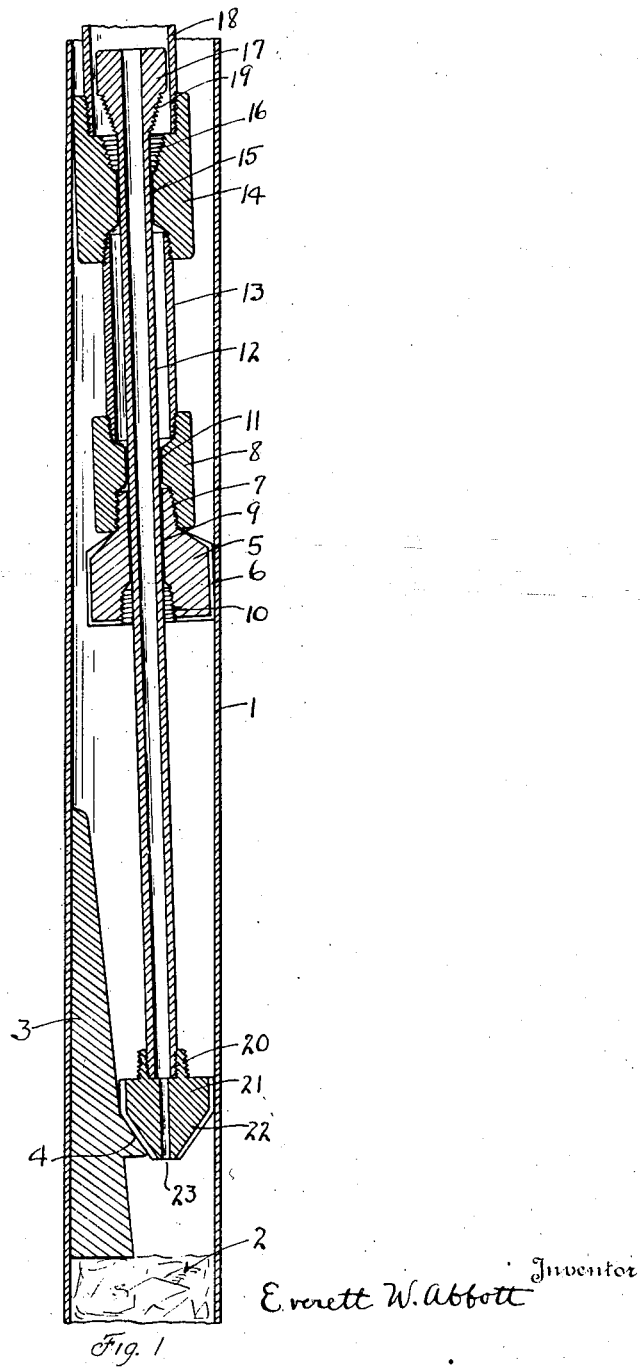

July 19, 1927.

E. W. ABBOTT

MILLING TOOL

Filed Feb. 28, 1927

1,636,032

Everett W. Abbott, Inventor

By Jesse R. Stone.

Attorney

Patented July 19, 1927.

1,636,032

UNITED STATES PATENT OFFICE.

EVERETT W. ABBOTT, OF HOUSTON, TEXAS.

MILLING TOOL.

Application filed February 28, 1927. Serial No. 171,592.

My invention relates to an improvement in milling tools, and particularly milling tools employed in side tracking operations in well drilling where the well becomes filled with broken pipe or tools or other so-called junk, which prevents the continued drilling of the well.

In drilling deep wells, it occasionally happens that the well becomes filled with metal objects, such as tools dropped into the well, or broken pipe and other similar objects, so that it becomes necessary to side track. This operations consists in introducing into the well a milling tool and deflecting the direction of this tool at a point above the junk in the well and cutting through the casing into the side of the hole and continuing the drilling down parallel with the old hole.

In carrying out this side tracking operation it is common to employ a whipstock or wedge-shaped piece of metal which is dropped to the bottom of the well and which acts to deflect the milling cutter through the side wall of the casing. It sometimes happens, however, that the milling tool is not deflected so as to cut through the side wall of the casing but the whipstock and the milling tool are rotated together and the milling tool is dulled without cutting a smooth hole through the casing.

It is an object of my invention to provide a means to guide the cutting tool in such manner as to force it through the side of the casing so as to provide an opening for the drill bit in a most effective manner.

It is desired that a guide be employed, in connection with the milling tool, which will engage with the whipstock and act to force the milling tool itself toward the side wall of the casing so as to cut a smooth and even opening therein for the drill.

In the drawing herewith, I have illustrated a central longitudinal section through a well casing showing my invention employed in connection with a milling tool, the tool also being shown in central vertical section.

I have shown an ordinary type of well casing 1 in which, it is to be understood that the lower end thereof has been filled with broken metal objects 2 so as to prevent the drill from cutting ahead within the well and continuing the drilling of the hole. I have shown a whipstock 3 placed upon the broken material, said whipstock being of the usual upwardly tapered wedge-shape construction, except that I provide on the tapered side of the whipstock a downwardly sloping lug 4, which is adapted to engage with the guide forming the subject of my invention.

The milling tool 5 is of the usual shape, having a cylindrical body with teeth 6 on the forward and lateral surface thereof. There is an upper threaded shank 7 thereon to engage with a special bearing coupling 8. The inner portion of the body has a longitudinal opening 9 therethrough within which my guide is adapted to fit. The lower end of the passage 9 is recessed and threaded at 10 to engage with the pilot of the guide member, as will be later described. The coupling 8 has its inner wall 11 adapted to fit about a guide barrel 12, which extends therethrough. This bearing 11 may be a close fitting sleeve of steel about the guide or may have anti-frictional means employed, if desired, the particular type of bearing not being a part of the invention. The coupling 8 serves to connect the milling tool with a nipple 13, which is engaged at its upper end within the lower end of a collar 14.

The collar 14 also has a central bearing opening 15 therein through which the guide barrel extends, the upper end of the opening being provided with a tapered threaded recess 16 to engage with the head 17 of the guide barrel. The coupling also serves to connect the nipple 13 with the drill stem 18 by means of which the milling tool is rotated.

The guide barrel 12 is a tubular rod or shaft, the upper end of which is formed into a head 17, previously referred to. This head has a lower tapered portion 19 threaded to engage within the socket 16 in the coupling 14. This threaded engagement is intended to connect the guide shaft or barrel with the coupling 14 while the tool is being introduced into the well. The lower end of the guide barrel 12 is connected at 20 with the shank of a pilot cutter 21. The shank of said cutter is threaded on its outer surface to engage within the socket 10 of the milling cutter when the cutters are brought together. The outer and forward surfaces of the pilot milling cutter 21 have teeth 22 thereon, as in case of the ordinary milling cutter, and a central passage 23 extending longitudinally of the pilot furnishes the passage for the flushing fluid.

When the device is introduced into the well, the head 17 of the guide barrel will be threaded within the socket 16 and the pilot cutter 21 will extend a suitable distance beyond the forward end of the milling tool 5. This pilot will eventually engage with the whipstock 3 and the contact of the pilot with the lug 4 of the whipstock will wedge the pilot head between the whipstock and the casing and form a firm anchor for the guide barrel. If the drill stem 18 is then rotated in a right-hand direction, it will unscrew the coupling 14 from the head 17 of the guide barrel and a further downward thrust and rotation upon the drill stem will cause the milling tool 5 to engage with the casing 1 and will mill away the material of the casing, cutting a hole laterally through the side wall thereof. The guide barrel 12 will furnish a deflecting means which will serve to guide the milling tool in a smooth, even cut through the casing in an obvious manner. When the milling tool 5 has drilled down through the casing and finally engages with the head 21 of the pilot, the socket 10 in the milling tool will be screwed downwardly over the shank of the pilot 21 and the two cutters will thus become as one and the continued rotation of the drilling stem will carry the milling tool laterally away from the junk at the bottom of the well in an obvious manner.

It will be noted that I have provided a simple means for properly deflecting the milling tool through the wall of the casing in such manner that a straight and smooth cut through the casing may be accomplished.

The advantages of this construction will be obvious to those skilled in the art.

What I claim as new and desire to protect by Letters Patent is:

1. In a milling tool for use in well drilling, a milling cutter having a central longitudinal opening therein, a drill stem, a collar thereon having a bearing opening therethrough, means connecting said collar with said milling cutter, a guide barrel extending longitudinally through said collar and said milling cutter and projecting forwardly beyond said milling cutter, and means on said guide barrel to anchor said barrel in an inclined position in a well for the purpose described.

2. In a milling tool for well drilling, a milling cutter having a longitudinal opening therethrough, a collar, said collar having a bearing opening therethrough, means connecting said collar with said cutter, a guide barrel extending through said collar and said cutter, and means to anchor said guide barrel in an inclined position in a well.

3. In a device of the character described, including a well casing, a whipstock in said casing, a milling tool, means to rotate said tool, a guide barrel extending longitudinally through said tool, and means on said guide barrel adapted to contact with said whipstock and casing to deflect said milling tool toward said casing.

4. In a device of the character described including a well casing, a whipstock in said casing, the combination of a milling tool, means to rotate said tool in said casing and means connected with said tool to engage said whipstock and guide said milling tool laterally in a uniformly inclined direction to cut said casing.

5. In a device of the character described including a well casing, a whipstock in said casing, the combination of a milling tool, means to rotate said tool in said casing, and means comprising a guide barrel extending axially through said tool and adapted to engage said whipstock and guide said milling tool laterally in a uniformly inclined direction to cut said casing.

6. In a device of the character described including a well casing and a whipstock therein, the combination of a milling tool in said casing, a drill stem connected therewith, and a guide member extending axially though said tool into said drill stem and adapted to project in advance of said tool to engage said whipstock and guide said tool toward said casing.

7. In a device of the character described including a well casing and a whipstock therein, the combination of a milling tool in said casing, a drill stem connected therewith, and a guide member extending axially through said tool into said drill stem and adapted to project in advance of said tool to engage said whipstock and guide said tool toward said casing and a lug on said whipstock to force said guide member into frictional contact with said casing.

8. In a device of the character described including a well casing and a whipstock therein, the combination of a milling tool in said casing, a drill stem connected therewith, and a guide member extending axially through said tool into said drill stem and adapted to project in advance of said tool to engage said whipstock and guide said tool toward said casing and bearing means for said member connected with said drill stem and tool.

In testimony whereof I hereunto affix my signature this 24 day of February, A. D. 1927.

EVERETT W. ABBOTT.